United States Patent

Kawamuro

[11] Patent Number: 5,823,090
[45] Date of Patent: Oct. 20, 1998

[54] POWER STEERING APPARATUS HAVING AN EASILY ADJUSTABLE COUNTER FORCE MECHANISM

[75] Inventor: Junji Kawamuro, Susono, Japan

[73] Assignee: Toyota Jidosha Kabushiki Kaisha, Toyota, Japan

[21] Appl. No.: 867,428

[22] Filed: Jun. 6, 1997

[30] Foreign Application Priority Data

Jul. 9, 1996 [JP] Japan .................................. 8-179527

[51] Int. Cl.$^6$ ...................................................... F15B 9/10
[52] U.S. Cl. ..................................................... 91/375 A
[58] Field of Search ............................ 91/375 R, 375 A; 137/625.21

[56] References Cited

U.S. PATENT DOCUMENTS

| | | | |
|---|---|---|---|
| 4,796,715 | 1/1989 | Futaba et al. ...................... | 91/375 A X |
| 4,905,784 | 3/1990 | Yamashita ........................... | 91/375 A X |
| 5,016,723 | 5/1991 | Sano .................................... | 91/375 A X |
| 5,046,574 | 9/1991 | Goodrich, Jr. et al. ........... | 91/375 A X |
| 5,190,119 | 3/1993 | Nomura et al. ..................... | 91/375 A X |

FOREIGN PATENT DOCUMENTS

| | | |
|---|---|---|
| A-62-152973 | 7/1987 | Japan . |
| A-4-27670 | 1/1992 | Japan . |
| B2-6-24947 | 4/1994 | Japan . |
| B2-6-49461 | 6/1994 | Japan . |

*Primary Examiner*—Hoang Nguyen
*Attorney, Agent, or Firm*—Oliff & Berridge, PLC

[57] ABSTRACT

A power steering apparatus in which an adjusting operation for an orifice, which is provide to optimize a steering characteristic, can be easily performed. A rotary control valve controls an amount of working oil to be supplied to a power assist cylinder in response to a relative rotation between an input member and an output member. A counter force mechanism, provided in the rotary control valve, includes a counter force plunger, a hydraulic pressure counter force chamber located on an outer side of the counter force plunger and an inside chamber located on an inner side of the counter force plunger. The counter force mechanism provides a counter force to the input member by a pressure difference between a pressure of the working oil in the hydraulic pressure counter force chamber and a pressure of the working oil in the inside chamber. A hydraulic pressure control valve is attached to the rotary control valve. The hydraulic pressure control valve includes a counter force mechanism port through which the working oil is supplied to the counter force mechanism. A connection passage connects between the inside chamber and the counter force mechanism port. An orifice is provided to a part of a connection passage located in the hydraulic pressure control valve.

7 Claims, 6 Drawing Sheets

POWER STEERING APPARATUS HAVING AN EASILY ADJUSTABLE COUNTER FORCE MECHANISM

BACKGROUND OF THE INVENTION

1. Field of the Invention

The present invention generally relates to a power steering apparatus and, more particularly, to a power steering apparatus which provides optimum steering feel by varying a torsion torque of a torsion bar by a counter force mechanism.

2. Description of the Related Art

Generally, a power steering apparatus provides a turning operation of a vehicle with a small operational force by providing a working hydraulic oil to a power cylinder by a rotary control valve. The hydraulic oil is provided in response to a relative rotation of an input member and an output member which are connected to each other by a torsion bar. The input member is connected to a steering wheel, and the output member is connected to wheels to be steered.

When the vehicle is stopped or moving at a low speed, a light steering operation is preferred. On the other hand, when the vehicle is moving at a high speed, a heavy steering operation is preferred so as to improve straight-line stability. Thus, a power steering apparatus of a so-called vehicle speed sensitive type is provided which controls heaviness of steering operation in response to vehicle speed.

The vehicle speed sensitive type power steering apparatus has a counter force mechanism which provides a counter force to the relative rotation of the rotary control valve. The counter force mechanism is provided with a counter force plunger located in a hydraulic pressure counter force chamber formed in a part of the output member. The counter force plunger is moved when working oil is supplied from a hydraulic pump to the hydraulic pressure counter force chamber. The counter force plunger presses the input member, and thereby a steering counter force can be provided.

Additionally, a hydraulic pressure control valve is provided between the hydraulic pump and the hydraulic pressure counter force chamber. The hydraulic pressure control valve controls the amount (pressure) of working oil supplied to the hydraulic pressure counter force chamber in response to vehicle speed. Specifically, the hydraulic pressure control valve is controlled so that the amount of working oil to be supplied to the hydraulic pressure counter force chamber from the hydraulic pump is decreased when the vehicle is moving at a low speed. On the other hand, the hydraulic pressure control valve is controlled so that the amount of working oil to be supplied to the hydraulic pressure counter force chamber from the hydraulic pump is increased when the vehicle is moving at a high speed.

Accordingly, when the vehicle is moving at a low speed, a pressing force exerted on the input member by the counter force plunger is decreased and a steering effort is decreased since the amount of working oil supplied to the hydraulic pressure counter force chamber is decreased. On the other hand, when the vehicle is moving at a high speed, the pressing force exerted on the input member by the counter force plunger is increased and the steering effort is increased since the amount of working oil supplied to the hydraulic pressure counter force chamber is increased.

FIG. 1 shows a hydraulic circuit of a conventional power steering apparatus. FIG. 2 is a cross-sectional view showing a state where the power steering apparatus is cut at a position of a counter force plunger. In each figure, 1 indicates a rotary control valve comprising an input member 14 and an output member 15; 2 indicates a hydraulic pressure control valve which is controlled in accordance with vehicle speed so as to supply working oil to a hydraulic pressure counter force chamber 7; 3 indicates a counter force plunger which generates a hydraulic pressure counter force by pressing the input member 14; and 4 indicates a hydraulic pump. Additionally, 5 indicates a reservoir which stores working oil and 6 indicates a fixed orifice which is provided to adjust the amount of working oil to be supplied to the hydraulic pressure counter force chamber 7.

The hydraulic pump 4 suctions the working pressure from the reservoir 5, and pressurizes and delivers the working oil to a large flow pipe 8. The large flow pipe 8 is connected to the rotary control valve 1. Thus, the working oil which was pressurized by the hydraulic pump is supplied to the rotary control valve 1. In the rotary control valve 1, the working oil is supplied to a power cylinder (not shown in the figures) in response to the relative rotation between the input member 14 and the output member 15. Thus, a power steering assist is provided to the steering effort. Additionally, the working oil discharged from the rotary control valve 1 is returned to the reservoir 5 via a large flow pipe 9.

A branching point A of the large flow pipe 8 is connected to a branch pipe 10. The branch pipe 10 is provided with the hydraulic pressure control valve 2 and the orifice 6 in a serial state in that order from the upstream side of the flow of the working oil. An end of the branch pipe 10 is connected to the large flow pipe 9. Additionally, a counter force pipe 11 is connected to a branch point C provided between the hydraulic pressure control valve 2 and the orifice 6 of the branch pipe 10. The counter force pipe 11 is connected to the hydraulic pressure counter force chamber 7.

Additionally, a inside chamber pipe 12 is connected to a branch point D of the large flow pipe 9. The inside chamber pipe 12 is connected to an inside chamber 13 which is formed in the interior of the counter force plunger 3. Accordingly, a part of the working oil flowing in the large flow pipe 9 is supplied to the inside chamber 13 via the inside chamber pipe 12.

As mentioned above, the working oil is supplied inside the plunger 3. This is because if the inside chamber 13 is sealed and air exists therein, the air acts as a damper which results in deterioration of the operational characteristic of the counter force plunger 3. In this structure, if the working oil leaks to the inside chamber 13 from a sliding position between the counter force plunger 3 and the hydraulic pressure counter force chamber 7, the inside chamber 13 may be filled with the leaked oil, and thereby the counter force plunger 3 may not operate normally. In order to prevent occurrence of these problems, the working oil is supplied to the inside chamber 13.

The hydraulic control valve 2 is formed as a variable throttle valve, a degree of opening of the variable throttle valve being controlled in response to vehicle speed. The amount of flow (pressure) of the working oil flowing from the branch point A to the hydraulic pressure counter force chamber 7 is determined by the degree of opening of the hydraulic pressure control valve 2. Thus, the amount (pressure) of the working oil supplied to the hydraulic pressure counter force chamber 7 corresponds to the vehicle speed.

The amount of working oil flowing to the hydraulic pressure counter force chamber 7 is also controlled by the orifice 6. That is, a part of the working oil flowing to the branch pipe 10 through the branch point A passes the orifice 6, and returns to the large flow pipe 9 through the junction B by the hydraulic pressure control valve 2 being opened. Thus, by adjusting the opening of the orifice 6, the amount (pressure) of flow of the working oil flowing to the hydraulic pressure counter force chamber 7 can be controlled. Thereby, the pressing force (hydraulic pressure counter force) exerted on the input member 14 by the counter force plunger 3 can be varied.

In the power steering apparatus shown in FIG. 1, the hydraulic pressure control valve 2 is closed when the vehicle is stopped or moving at a low speed so as to prevent generation of the hydraulic pressure counter force in the hydraulic pressure counter force chamber 7. Thus, the pressing force exerted on the input member 14 by the counter force plunger 3 is decreased when the vehicle is stopped or moving at a low speed, resulting in a reduction in the steering effort.

In this case, the pressure (hereinafter referred to as a counter force pressure $P_H$) in the hydraulic pressure counter force chamber 7 is equal to the pressure at the branch point C since the hydraulic pressure control valve 2 is closed. Additionally, since the pressure loss by the orifice 6 can be negligible, the pressure at the branch point C is equal to the pressure at the junction B. On the other hand, the inside pressure $P_{r2}$, which is the pressure of the working oil at the branch point D, is equal to the pressure in the inside chamber 13.

Now, reference is made to the relationship between the counter force pressure $P_H$ and the inside pressure $P_{r2}$. A pressure loss due to the flow resistance of the large flow pipe 9 from the branch point D to the junction B is referred to as $P_{loss}$. The counter force pressure $P_H$ is represented as $P_H = P_{r2} - P_{loss}$. The pressure loss $P_{loss}$ is proportional to the length of the pipe between the branch point D to the junction B. Additionally, the pressure loss Ploss is also proportional to the amount of flow of the working oil in the large flow pipe 9.

As mentioned above, in a state where the hydraulic pressure control valve 2 is closed, the amount of flow in the large flow pipe 9 is large. Additionally, when the length of the large flow pipe 9 between the branch point D to the junction B is large, it is possible that a condition occurs in which the inside pressure $P_{r2}$ is greater than the counter force pressure $P_H$ ($P_{r2} > P_H$).

If the inside pressure $P_{r2}$ is greater than the counter force pressure $P_H$ as mentioned above, the counter force plunger 3 is urged from inside to outside by the working oil. Thus, the counter force plunger 3 is separated from the input member 14, resulting in a gap being formed between the counter force plunger 3 and the input member 14. Thus, when the working oil is supplied to the hydraulic pressure counter force chamber 7 through the branch point A by the hydraulic pressure control valve being opened as the vehicle speed is increased, the counter force plunger 3 moves toward the input member 14, and finally collides with the input member 14. Accordingly, in the power steering apparatus having the above-mentioned structure, there is a problem in that an irregular noise is generated when the vehicle speed is increased from a stopped state or a low-speed state, or a smooth steering operation cannot be achieved.

In order to solve the above-mentioned problems, Japanese Patent Publication No.6-24947 suggests a power steering apparatus. FIG. 3 shows a hydraulic circuit of the above-mentioned Patent Publication. FIG. 4 is a cross-sectional view of the power steering apparatus disclosed in the above-mentioned Patent Publication cut at a position where a counter force plunger is located. In FIGS. 3 and 4, parts that are the same as the parts shown in FIGS. 1 and 2 are given the same reference numerals, and descriptions thereof will be omitted.

The power steering apparatus shown in each figure features the orifice 6 provided between the branch pipe 10 and the inside pipe 12 so as to bypass the counter force plunger 3. Specifically, as shown in FIG. 4, a passage is provided in the output member 15 so as to connect the hydraulic pressure counter force chamber 7 to the inside chamber 13. The orifice 6 is provided in the passage.

In this structure, if the inside pressure $P_{r2}$ is greater than the counter force pressure $P_H$ when the vehicle is stopped or moving at a low speed, the working oil in the inside chamber 13 flows into the hydraulic pressure counter force chamber 7 through the orifice 6. Thereby, the pressure $P_H$ in the hydraulic pressure counter force chamber 7 and the pressure $P_{r2}$ in the inside chamber 13 are balanced. Thus, the counter force plunger 3 is prevented from being separated from the input member 14.

As mentioned above, the counter force plunger 3 maintains contact with the input member 14 even when the vehicle is stopped or moving at a low speed by providing the orifice 6 between the branch pipe 10 and the inside pipe 12. Thus, the counter force plunger 3 does not collide with the input member 14 when the working oil is supplied to the hydraulic pressure counter force chamber 7 by the hydraulic pressure control valve 2 being opened due to an increase in the vehicle speed. Accordingly, generation of an irregular noise is prevented, and a smooth change in the steering effort can be achieved.

The above-mentioned power steering apparatus is provided with the orifice 6 inside the output member 15 as shown in FIG. 4. In such a case where the orifice 6 is provided in a deep position of the power steering apparatus, there is a problem in that an adjusting operation of the orifice 6 cannot be easily performed. This problem will be described in detail below.

As mentioned above, the amount of working oil supplied to the hydraulic pressure counter force chamber 7 is also controlled by the orifice 6. Thus, in order to optimize the hydraulic pressure counter force generated in the hydraulic pressure counter force chamber 7, the amount of restriction by the orifice 6 must be adjusted to a suitable value. Additionally, the adjusting operation of the orifice 6 is preferred to be performed while the orifice 6 is assembled in the power steering apparatus so that assembling tolerances are absorbed.

However, in the structure in which the orifice 6 is provided in a part of the output member 15, which is deep inside the power steering apparatus, the power steering apparatus must be disassembled so as to take out the orifice 6 when the orifice 6 does not function to provide a desired performance if the adjusting operation is performed in the assembled state of the apparatus. The disassembly operation requires a great effort since most of the component parts constituting the power steering apparatus are disassembled. Thus, in the power steering apparatus in which the orifice 6 is provided inside the output member 15, the adjusting operation is complex and inconvenient.

SUMMARY OF THE INVENTION

It is a general object of the present invention to provide an improved and useful power steering apparatus in which the above-mentioned problems are eliminated.

A more specific object of the present invention is to provide a power steering apparatus in which an adjusting operation for an orifice, which is provide to optimize a steering characteristic, can be easily performed.

In order to achieve the above-mentioned object, there is provided according to the present invention a power steering apparatus comprising:

a rotary control valve, provided in a valve housing, including an input member and an output member connected to each other by a torsion bar, the rotary control valve controlling an amount of working oil to be supplied to a power assist cylinder in response to relative rotation between the input member and the output member;

a counter force mechanism, provided in the rotary control valve, including a counter force plunger, a hydraulic pressure counter force chamber located on an outer side of the counter force plunger and an inside chamber located on an inner side of the counter force plunger, the counter force mechanism providing a counter force to the input member by a pressure difference between a pressure of the working oil in the hydraulic pressure counter force chamber and a pressure of the working oil in the inside chamber;

a hydraulic pressure control valve attached to the rotary control valve, the hydraulic control valve including a counter force mechanism port through which the working oil is supplied to the counter force mechanism; and a connection passage connecting between the inside chamber and the counter force mechanism port.

According to the above-mentioned invention, the rotary control valve controls the amount of working oil to be supplied to the power assist cylinder in response to the relative rotation between the input member and the output member. That is, the rotary control valve selectively supplies the working oil to a right cylinder chamber or a left cylinder chamber of the power assist cylinder in response to the direction of rotation of the input member connected to a steering wheel. The working oil supplied to the power assist cylinder generates a steering assist power. The rotary control valve is provided in the valve housing.

The counter force mechanism includes the counter force plunger, the hydraulic pressure counter force chamber and the inside chamber. The counter force plunger provides a counter force to the input member when the pressurized working oil is supplied to the hydraulic pressure counter force chamber which is located on the outer side of the counter force plunger.

The hydraulic pressure control valve is attached to the valve housing of the rotary control valve, and includes the counter force mechanism port through which the working oil is supplied to the hydraulic pressure counter force chamber.

In the above-mentioned structure, the hydraulic pressure counter force chamber is connected to the inside chamber located on the inner side of the counter force plunger by the connection passage which connects the hydraulic pressure counter force chamber to the counter force mechanism port. Thus, if a pressure in the inside chamber exceeds the pressure in the hydraulic pressure counter force chamber when the vehicle is stopped or moving at a low speed, the working oil in the inside chamber flows into the hydraulic pressure counter force chamber through the connection passage. Thereby, the pressure in the inside chamber and the pressure in the hydraulic pressure counter force chamber are balanced which causes the counter force plunger to always maintain contact with the input member. Thus, the Conner force plunger is prevented from colliding with the input member when a highly pressurized working oil is provided to the hydraulic pressure counter force chamber. This results in prevention of generation of irregular noise due to the collision of the counter force plunger with the input member. Additionally, a smooth change in the heaviness of the steering effort can be achieved.

Additionally, the connection passage may include a first connection port and a second connection port, the first connection port formed in the valve housing, the second connection port formed in the hydraulic pressure control valve.

According to this invention, the pressure loss provided by the connection passage can be controlled by adjusting the second connection port which is provided in the hydraulic pressure control valve. Since the hydraulic pressure control valve is attached to the rotary control valve, the adjustment work can be performed while the hydraulic pressure control valve including the second connection port is separated from the rotary control valve. This achieves an easy adjustment of the pressure loss provided between the inside chamber and the hydraulic pressure counter force chamber. Additionally, an adjustment of hydraulic characteristics of the hydraulic pressure control valve including the connection passage can be performed by the hydraulic pressure control valve alone.

In one embodiment according to the present invention, an orifice may be provided to the second connection port. The orifice provides a predetermined pressure loss between the inside chamber and the hydraulic pressure counter force chamber.

Alternatively, a predetermined flow resistance may be provided to the second connection port so as to provide a predetermined pressure loss between the inside chamber and the hydraulic pressure counter force chamber.

A predetermined flow resistance may be provided to the connection passage so as to restrict a flow of the working oil from the inside chamber to the counter force mechanism port.

Additionally, in the power steering apparatus according to the present invention, the connection passage may include a passage located between the inside chamber and an inner wall of the valve housing so as to leads the pressure of the working oil in the inside chamber to an inner side of the valve housing.

The connection passage may further include a first connection port and a second connection port, the first connection port formed in the valve housing and connected to the passage, the second connection port formed in the hydraulic pressure control valve.

Other objects, features and advantages of the present invention will become more apparent from the following detailed description when read in conjunction with the accompanying drawings.

DETAILED DESCRIPTION OF THE PREFERRED EMBODIMENT

A description will now be given, with reference to the figures, of an embodiment of the present invention.

Figure 1:
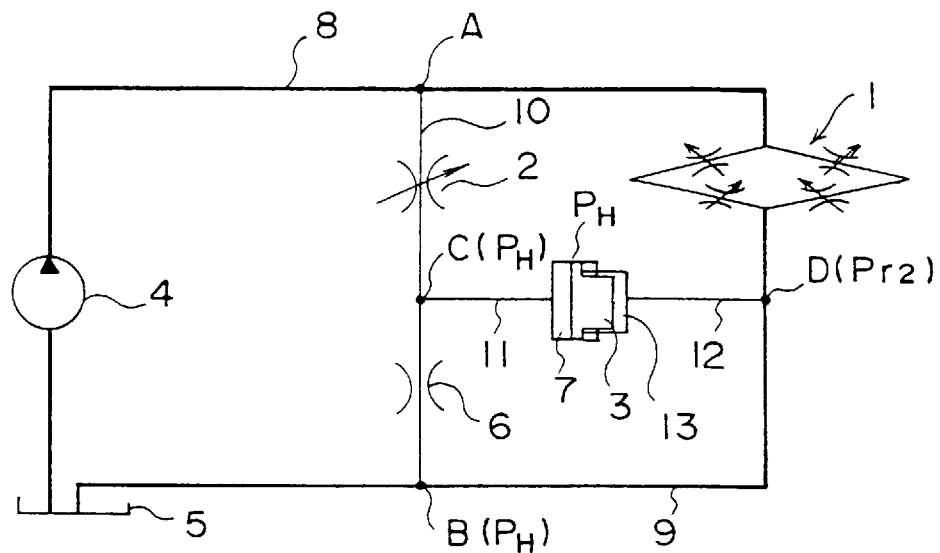
FIG. 1 is a hydraulic circuit diagram of a conventional power steering apparatus.
Figure 2:
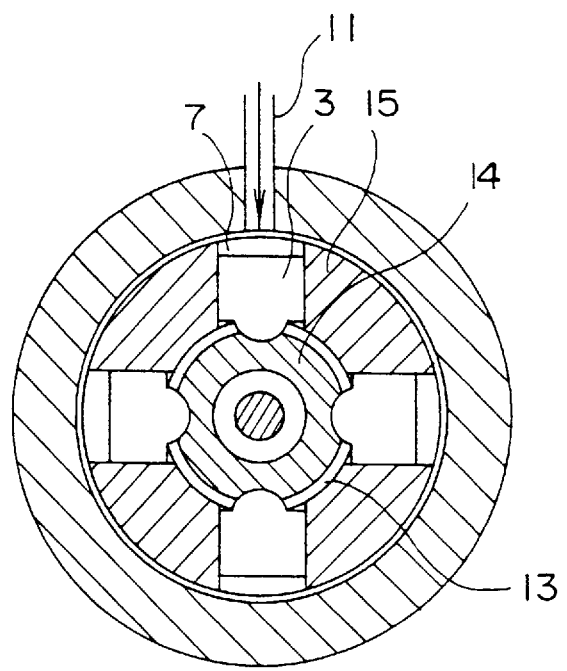
FIG. 2 is a cross-sectional view of the power steering apparatus shown in FIG. 1.
Figure 3:
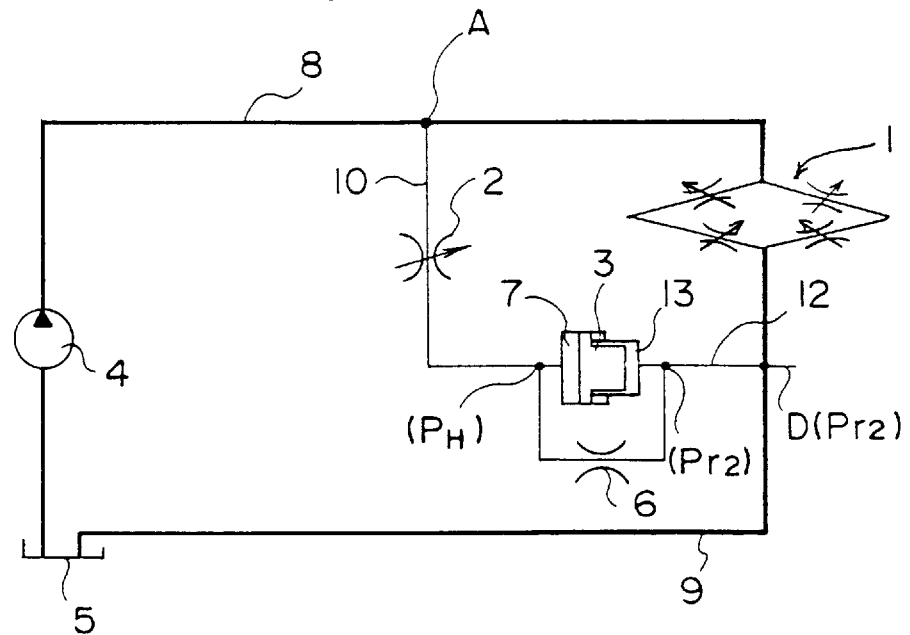
FIG. 3 is a hydraulic circuit diagram of another conventional power steering apparatus.
Figure 4:
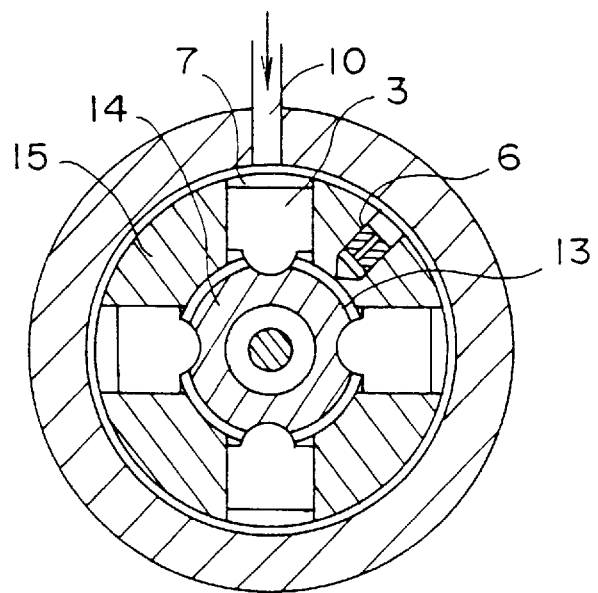
FIG. 4 is a cross-sectional view of the power steering apparatus shown in FIG. 3.
Figure 5:
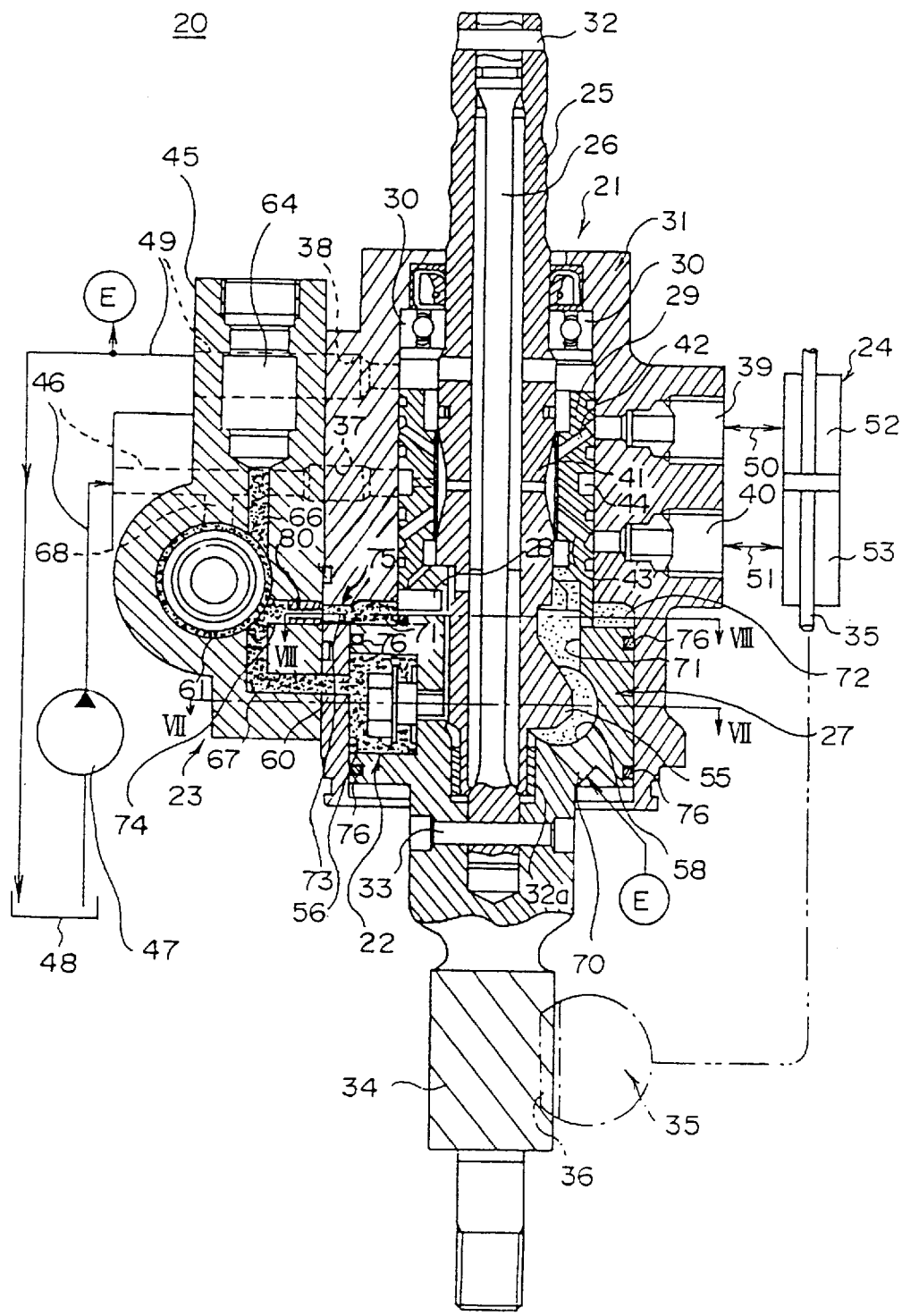
FIG. 5 is a cross-sectional view of a power steering apparatus according to an embodiment of the present invention.

FIG. 5 shows a power steering apparatus 20 according to an embodiment of the present invention. The power steering apparatus 20 comprises a rotary control valve 21, a counter force mechanism 22, a hydraulic control valve 23 and a power cylinder 24.

First, a description will be given of the rotary control valve 21 included in the power steering apparatus 20. The rotary control valve 21 comprises a valve shaft (input member) 25 which is connected to a steering wheel, a torsion bar 26 which is inserted into the valve shaft 25, a pinion shaft (output member) 27 which is connected to the valve shaft 25 via the torsion bar 26 and a valve body 29 which is integral with the pinion shaft 27 via a pin 28.

The valve shaft 25 is supported by a valve housing 31 via a bearing 30, and is rotatably supported by the pinion shaft 27 via a bushing 32a which also functions as an oil seal. Thereby, the valve shaft 25 is rotatably supported within the pinion shaft 27 and the valve housing 31.

An upper end of the torsion bar 26 is connected to the valve shaft via a pin 32. a lower end of the torsion bar 26 is connected to the pinion shaft via a pin 33. The torsion bar 26 is distorted (twisted) by a steering torque being applied to the valve shaft 25 from a steering wheel as described later. Thereby, a relative dislocation occurs between the valve shaft 25 and the pinion shaft 27.

The pinion shaft 27 is rotatably supported by a rack housing (not shown in the figure) provided in a lower part of the valve housing 31. Additionally, a pinion 34 is formed on a lower part of the pinion shaft 27. The pinion 34 engages a rack 36 formed on a rack bar 35. Wheels to be steered are connected to the opposite ends of the rack bar 35 so that the direction of the steering wheels is changed and thus the steering operation is performed by the rack bar 35 being moved along a straight line.

In the above-mentioned structure, when the steering wheel is operated to input a rotational force (steering torque) to the valve shaft 25, the steering torque is transmitted to the pinion shaft 27 via the torsion bar 26. The rack bar 35 is selectively moved in the right steering direction or the left steering direction by the rotation of the pinion shaft 27 so as to achieve a steering operation.

A plurality of flow paths 42–44 are formed in predetermined directions of the valve body 29 so that the working oil flows therethrough. An inlet port 37, an outlet port 38, a right steering port 39 and a left steering port 40 are formed in the valve housing 31 to connect to the flow paths 42–44. Additionally, an oil passage groove 41 is formed in the valve shaft 25 at a position where the valve shaft 25 is opposite to an inner part of the valve body 20 so that the oil passage groove 41 is connected to the flow paths 42 and 43.

The inlet port 37 is connected to a supply side large flow pipe (hereinafter referred to as a supply pipe) 46. The supply pipe 46 is connected to an oil pump 47. The oil pump 47 suctions working oil from a reservoir 48 which stores the working oil, and pressurizes and delivers the working oil to the supply pipe 46. Thus, the working oil delivered from the oil pump 47 is supplied to the rotary control valve 21 via the supply pipe 46 and the inlet port 37.

The outlet port 38 is connected to a discharge side large flow pipe (hereinafter referred to as a discharge pipe) 49 which is formed in a housing 45 of the hydraulic pressure control valve 23. The discharge pipe 49 is connected to the reservoir tank 48. Thus, the working oil which is no longer needed by the rotary control valve 21 is discharged to the reservoir tank 48 via the outlet port 38 and the discharge pipe 49.

The right steering port 39 and the left steering port 40 are connected, via pipes 50 and 51, to the power cylinder 24 which performs a power assist for the rack bar 35. The right steering port 39 is connected to a right assist cylinder chamber 52 of the power cylinder, and the left steering port 40 is connected to a left assist cylinder chamber 53 of the power cylinder.

In the above-mentioned structure, when the steering wheel is operated and a rotational force (rotational torque) is transmitted to the valve shaft 25 which is the input member, the torsion bar 26 is twisted in response to the magnitude of the rotational torque which results in generation of a relative displacement between the valve shaft 25 and the valve body 29 (pinion shaft 27). When the relative displacement is generated between the valve shaft 25 and the valve body due to the distortion of the torsion bar 26, the valve shaft 25 rotates further by the amount of distortion. Thus, the valve shaft 25 is displaced in the right direction or the left direction relative to the valve body 29 with respect to the state (neutral state) where the rotational torque is not input.

In this neutral state, the degree of connection of the oil passage groove 41 formed in the valve shaft 25 to one of the passage 42 connected to the right steering port 39 and passage 43 connected to the left steering port 40 is varied in response to the direction of rotation of the steering wheel. Specifically, when the steering wheel is at the neutral position, the same pressure is applied to the inlet port 37 and the ports 39 and 40. The supplied working oil is discharged to the reservoir tank 48 via the outlet port 38.

When the steering wheel is rotated to the right direction, the degree of connection between the inlet port 37 and the right steering port 39 is increased due to the relative displacement generated between the valve shaft 25 and the valve body 29. Accordingly, the working oil is supplied to the right assist cylinder chamber 52 of the power cylinder 24 so that the rack bar 35 is power assisted in the right steering direction. Additionally, the working oil in the left assist cylinder chamber 53 is discharged from the outlet port 38 to the reservoir tank 48 via the left steering port 40.

On the other hand, when the steering wheel is rotated to the left direction, the degree of connection between the inlet port 37 and the left steering port 40 is increased. Accordingly, the working oil is supplied to the left assist cylinder chamber 53 of the power cylinder 24 so that the rack bar 35 is power assisted in the left steering direction. Additionally, the working oil in the right assist cylinder chamber 52 is discharged from the outlet port 38 to the reservoir tank 48 via the right steering port 39.

By performing the above-mentioned operations, the rack bar 35 is power assisted in the right direction by the power cylinder 24 when the steering wheel is turned in the right steering direction, and is power assisted in the left direction when the steering wheel is turned in the left direction. Thus, an operation of the steering wheel is performed with a small steering effort.

If only the above-mentioned rotary control valve 21 is provided to the power steering apparatus, the power assist is achieved in the steering direction, but a steering effort which is responsive to vehicle speed cannot be obtained. As mentioned above, a small steering effort is preferable when the vehicle is stopped or moving at a low speed, and, on the other hand, a relatively heavy steering effort is preferred when the vehicle is moving at a high speed so as to improve straight line stability. In order to control heaviness of the steering effort, the counter force mechanism 22 and the hydraulic pressure control valve 23 are provided to the power steering apparatus 20 so as to provide a counter force to the relative rotation of the rotary control valve 21 in response to the speed of the vehicle.

Figure 7A:
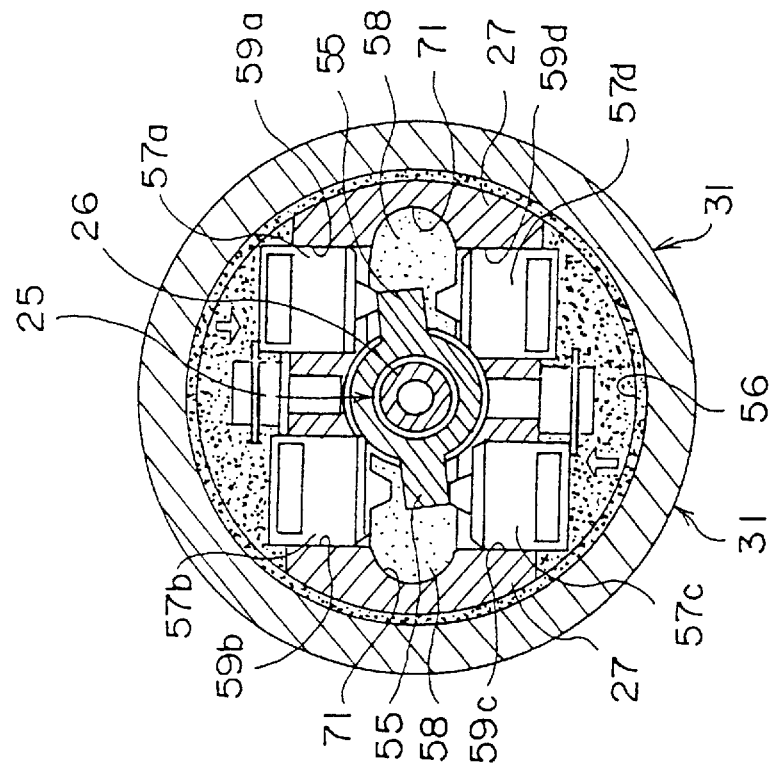
FIG. 7A is a cross-sectional view taken along a line VII—VII of FIG. 5 in a state where a counter force plunger is not operated.
Figure 7B:
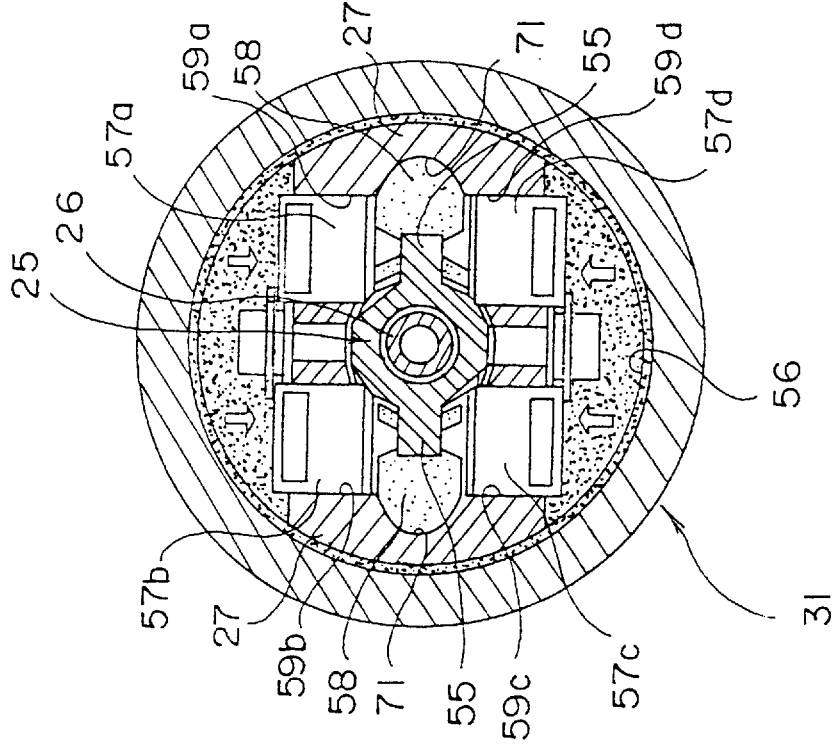
FIG. 7B is a cross-sectional view taken along the line VII—VII of FIG. 5 in a state where the counter force plunger is operated.
Figure 8:
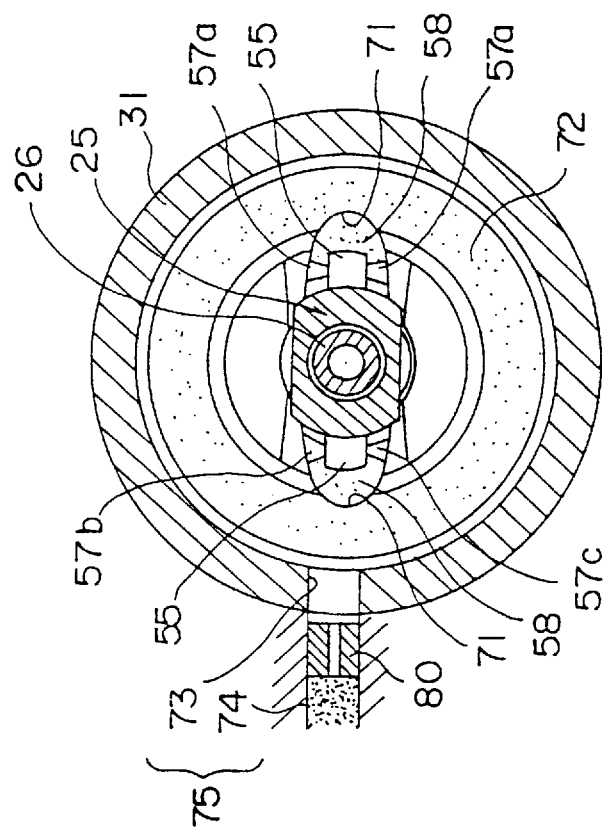
FIG. 8 is a cross-sectional view taken along a line VIII—VIII of FIG. 5.

A description will now be given, with reference to FIGS. 7A, 7B and 8 in addition to FIG. 5, of the counter force mechanism. FIGS. 7A and 7B are cross-sectional views taken along a line VII—VII of FIG. 5. FIG. 8 is a cross-sectional view taken along a line VIII—VIII of FIG. 5.

The counter force mechanism 22 is provided to the pinion shaft 27, and comprises protruding portions 55, a hydraulic pressure counter force chamber 56, counter force plungers 57a–57d and inside chambers 58. The protruding portions 55 are integrally formed with the valve shaft 25 on the pinion shaft 27 side and near the end thereof. The protruding members 55 protrude in radial directions from the opposite sides of a shaft portion of the valve shaft 25 as shown in FIGS. 7A and 7B. The pinion shaft 27 is formed with the inside chambers 58 in which the respective protruding portions 55 are inserted. The protruding portions 55 are rotatable about the axis of the valve shaft 25 within the inside chambers 58 by a few degrees.

Insertion openings 59a–59d are formed in the pinion shaft 27. The counter force plungers 57a–57d are inserted into the insertion openings 59a–59d, respectively. Additionally, the hydraulic pressure counter force chamber 56 is formed between the outer side of the counter force plungers 57a–57d and the valve housing 31. The inner side of the counter force plunger 57a–57d is positioned in the inside chamber 58 so as to face the protruding portions. That is, the inner end of each of the counter force plungers 57a–57d faces the inside chamber 58, and the outer end of each of the plungers faces the hydraulic pressure counter force chamber 56.

It should be noted that the counter force plungers 57a–57d sealingly slide within the respective insertion openings 59a–59d. Thus, The hydraulic pressure counter force chamber 56 and the inside chamber 58 are sealingly separated from each other.

On the other hand, the hydraulic pressure counter force chamber 56 is connected to a counter force port 60 formed in the valve housing 31. The counter force port 60 is connected to a counter force mechanism port 61 via a counter force pipe 67 formed in the housing 45 of the hydraulic pressure control valve 23. Accordingly, when the working oil is supplied from the hydraulic pressure control valve 23 to the hydraulic pressure counter force chamber 56 via the counter force mechanism port 61, the counter force pipe 67 and the counter force port 60, the pressure in the hydraulic pressure counter force chamber 56 is increased. Thus, the counter force plungers 57a–57d move in directions (inward directions) as indicated by arrows in FIG. 7A. Thereby, the protruding portions 55 are held by the counter force plungers 57a–57d. Thus, the hydraulic pressure counter force can be provided by the relative rotation between the valve shaft 25 and the pinion shaft 27.

Accordingly, when the valve shaft 25 is in the neutral position as shown in FIG. 7A, a high degree of neutral stability can be realized. Additionally, when the steering wheel is operated and the valve shaft 25 is rotated, the protruding portions 55 press the selected counter force plungers 57a–57d (in the figure, the counter force plungers 57a and 57c are pressed) so as to provide a hydraulic pressure counter force in the direction in which the rotation of the protruding portions 55 are prevented. Thus, the necessary steering effort can be increased.

As mentioned above, the heaviness of the steering operation must be controlled in response to the speed of the vehicle. Specifically, the necessary steering effort must be increased when the speed of the vehicle is high. That is, when the speed of the vehicle is high, the working oil must be supplied to the hydraulic pressure counter force chamber 56. The supply of the working oil to the hydraulic pressure counter force chamber 56 is controlled by the hydraulic pressure control valve 23.

Figure 6:
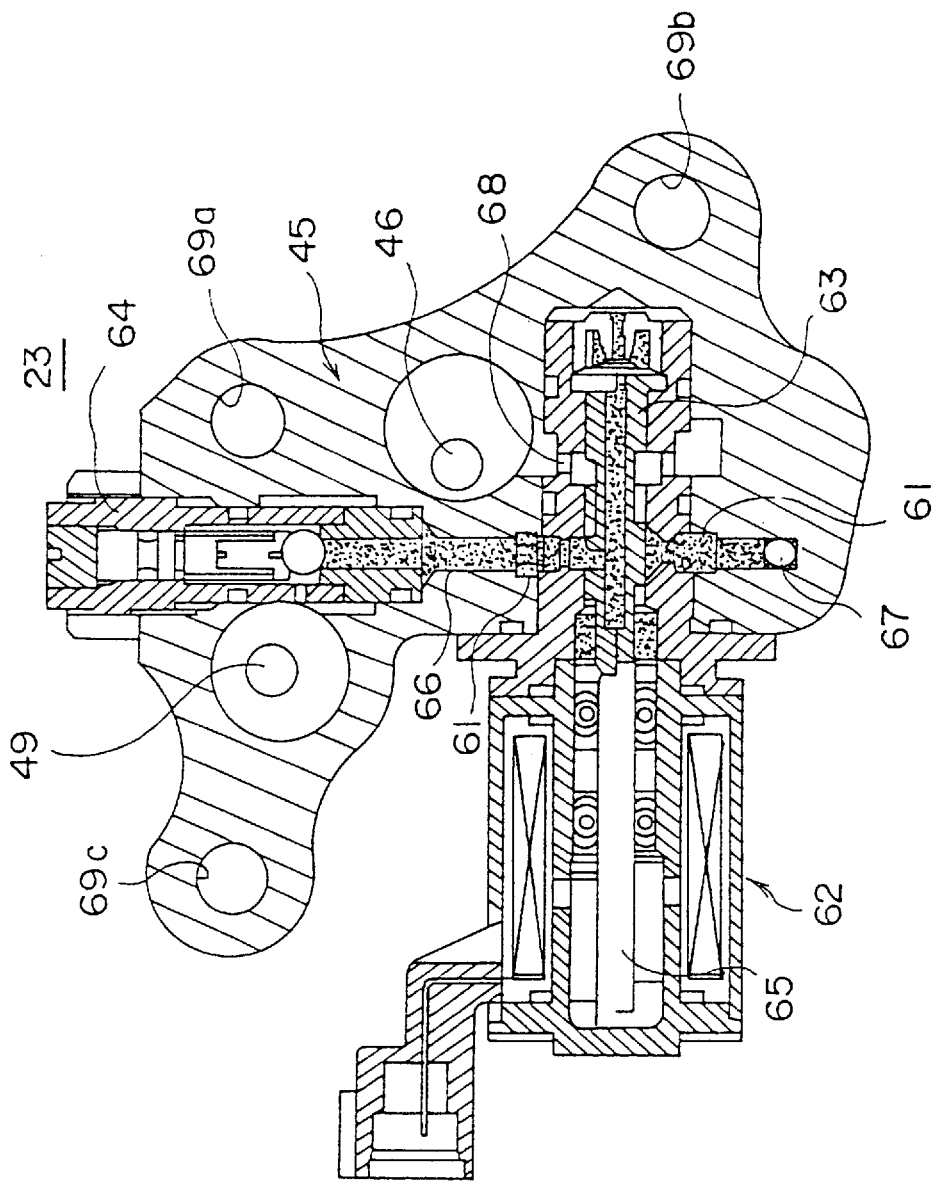
FIG. 6 is a cross-sectional view of a pressure control valve provided in the power steering apparatus shown in FIG. 5.

A description will now be given, with reference to FIG. 6 in addition to FIG. 5, of the hydraulic pressure control valve 23. The hydraulic pressure control valve 23 is detachable to the rotary control valve 21, and comprises the housing 45, a solenoid 62, a spool 63 and a relief valve 64.

The solenoid 62 is connected to an ECU (electronic control unit) which is not shown in the figures so that operation of the solenoid is controlled by the ECU. Additionally, a spool 63 is connected to the operational shaft 65 of the solenoid 62 so that the spool 63 is moved in directions along a straight line extending between the left side and the right side in FIG. 6 by controlling the operation of the solenoid 62. Additionally, the housing 45 is formed with the above-mentioned supply pipe 46, discharge pipe 49, counter force mechanism port 61 and counter force pipe 67. Further, the counter force mechanism port 61 is provided with an adjustment pipe 66 connected to a relief valve 64.

As mentioned above, the supply pipe 46 is connected to the inlet port 37 of the rotary control valve 21. Thus, a large part of the working oil from the hydraulic pump 47 flows into the inlet port 37. A branch port 68 is formed in the supply pipe 46, and the branch port 68 is connected to the spool 63. Additionally, the supply pipe 46 and the counter force mechanism port 61 are connected when the solenoid valve is operated to move the spool 63. Accordingly, by connecting the supply pipe 46 and the counter force mechanism port 61, a part of the working oil delivered from the hydraulic pump 47 is supplied to the counter force mechanism port 61.

The above-mentioned solenoid 62 is controlled by the ECU to which information regarding speed of the vehicle is provided. Thus, the ECU operates the solenoid 62 based on the information regarding speed of the vehicle so as to control the opening degree of the hydraulic pressure control valve 23 so that the supply pipe 46 and the counter force mechanism port 61 are connected to each other. Thereby, the highly pressurized working oil flowing in the supply pipe 46 is supplied to the hydraulic pressure counter chamber 56 via the branch port 68, the spool 63, the counter force mechanism port 61, the counter force pipe 67 and the counter force port 60.

Accordingly, the counter force plungers 57a–57d press the protruding portions 55 of the valve shaft 25 by the highly pressurized working oil supplied to the hydraulic pressure counter force 56. Thereby, the hydraulic pressure counter force can be provided to the relative rotation between the valve shaft 25 and the pinion shaft 27.

It should be noted that when the speed of the vehicle is low, the ECU operates the solenoid 62 so as to close the counter force mechanism port 61. Thereby, the highly pressurized working oil flowing in the supply pipe 46 is not supplied to the hydraulic pressure counter force chamber 56, and thus the pressing force exerted on the counter force plungers 57a–57d by the protruding portions 55 is released. Thus, the hydraulic pressure counter is not provided to the relative rotation between the valve shaft 25 and the pinion shaft 27. Thus, a light steering wheel operation can be achieved when the vehicle is stopped or moving at a low speed.

On the other hand, the relief valve 64 operates when the pressure in the adjustment pipe 66 exceeds a predetermined value so as to provided a function to connect the adjustment pipe 66 to the discharge pipe 49. Thereby, even when there is fluctuation in the pressure of the working oil supplied from the hydraulic pump 47, the pressure inside the counter force mechanism chamber 56 can be stabilized, resulting in stabilization of the operation of the counter force mechanism 22. It should be noted that reference numerals 69a—69c indicates mounting holes provided for mounting the hydraulic pressure control valve 23 to the housing 31 of the rotary control valve 21.

A description will now be given, with reference to FIGS. 5, 7A, 7B and 8, of the inside chamber 58 which constitutes the counter force mechanism 22.

A mentioned above, the inside chamber is formed in a position where the protruding portion 55 of the pinion shaft 27 is provided, that is, an inner position of the counter force plungers 57a–57d. An inside chamber port 70 is formed in the inside chamber 58, and the inside chamber port 70 is connected to the discharge pipe 49. That is, the working oil is supplied to the inside chamber 58 which is located on the inner side of the counter force plungers 57a–57d.

Additionally, a connection groove 71 is formed in the pinion shaft 27. An lower end of the connection groove 71 is connected to the inside chamber 58. The connection groove 71 extends upwardly along the valve shaft 25. The upper end of the connection groove 71 is connected to an annular passage 72.

The annular passage 72 is a space formed between the upper end surface of the pinion shaft 27 and the valve housing 31. The annular passage 72 is formed in a generally annular shape to encircle the valve shaft 25 as shown in FIG. 8. Since the inside chamber 58 is connected to the annular passage 72 via the connection groove 71 as mentioned above, the working oil supplied to the inside chamber 58 passes through the connection groove 71 and is supplied to the annular passage 72. Additionally, a first connection port 73 is formed in the valve housing 31. The first connection port 73 is connected to the annular passage 72. Accordingly, the inside chamber 58 is extended to an outer surface of the valve housing 31 by the above-mentioned connection groove 71, annular passage 72 and first connection port 73.

Additionally, a second connection port 74 is formed in the housing 45 at a position corresponding to the first connection port 73. Accordingly, in a state where the hydraulic pressure control valve 23 is assembled to the rotary control valve 21, the first and second connection ports 73 and 74 are connected to each other so as to form a connection passage 75. The present invention features an orifice 80 provided in the connection passage 75. Particularly, in the present embodiment, the orifice 80 is provided to the second connection port 74 formed on the side of the hydraulic pressure control valve 23.

The first connection port 73 is connected to the inside chamber 58 via the annular passage 72 and the connection groove 71. The second connection port 74 is connected to the hydraulic pressure counter force chamber 56 via the counter force mechanism port 61, the counter force pipe 67 and the counter force port 60. Accordingly, the hydraulic pressure counter force chamber 56 is connected to the inside chamber 58 via the orifice 80.

Additionally, since oil seals are provided at lower and upper ends of the pinion shaft where the hydraulic pressure counter force chamber 56 is formed, the working oil in the hydraulic pressure counter force chamber 56 is sealingly separated from the working oil in the inside chamber 58, the connection groove 71 and the annular passage 72. Accordingly, the hydraulic pressure counter force chamber 56 is connected to the inside chamber 58 only by the orifice 80.

A description will now be given of a relationship between a pressure $P_H$ (hereinafter referred to as a counter force pressure) which is applied to the hydraulic pressure counter force chamber 56 and a pressure $P_{r2}$ (hereinafter referred to as an inside pressure) which is applied to the inside chamber 58. In the power steering apparatus shown in FIG. 5, parts provided with the counter force pressure $P_H$ are illustrated as dark dotted areas, and the parts provided with the inside pressure $P_{r2}$ are illustrated as light dotted areas.

It is assumed that the vehicle is stopped or moving at a low speed and, thus, the supply of working oil from the hydraulic pump 47 to the counter force mechanism 22 is stopped due to the hydraulic pressure control valve 23 being closed. In the state where the working oil is not supplied to the counter force mechanism 22, it is possible that the inside pressure $P_{r2}$ in the inside chamber 58 exceeds the counter force pressure $P_H$ in the hydraulic pressure counter force chamber 56 ($P_{r2} > P_H$).

However, in the power steering apparatus 20 according to the present embodiment, since the connection port 75, which is provided with the orifice 80, connects the inside chamber 58 to the hydraulic pressure counter force chamber 56, the working oil in the inside chamber 58 passes through the orifice 80 and enters the hydraulic pressure counter force chamber 56. Thereby, the counter force pressure $P_H$ in the hydraulic pressure counter force chamber 56 can be balanced with the inside pressure $P_{r2}$ in the inside chamber 58 ($P_H = P_{r2}$). Thus, the counter force plungers 57a–57d are prevented from being separated from the protruding portions 55.

Accordingly, if the speed of the vehicle is increased from the stopped state or the low speed state and highly pressurized working oil is supplied to the hydraulic pressure counter force chamber 56 by the hydraulic pressure control valve 23 being opened, the counter force plungers 57a–57d do not collide with the protruding portions 55. Thus, generation of an irregular noise can be prevented, and a smooth change in the steering effort can be achieved.

Additionally, since the hydraulic pressure control valve 23 and the rotary control valve 21 are separated from each other, the connection passage 75, which connects the inside chamber 58 provided in the rotary control valve 21 to the counter force mechanism port 61 provided in the hydraulic pressure control valve 23, is extended from the rotary control valve 21 toward the hydraulic pressure control valve 23. Further, since the orifice 80 can be provided at any position along the connection passage 75, there is a degree of freedom in the positioning of the orifice 80. Thus, the orifice 80 may be provided at a position where the adjustment operation is easily performed. That is, the orifice 80 can be easily adjusted so that an optimum steering characteristic is achieve.

Additionally, in the present embodiment, since the orifice 80 is provided to the second connection port 74 (connection passage 75) which is formed in the housing 45 of the hydraulic pressure control valve 23, the hydraulic pressure control valve 23 can be removed from the rotary control valve 21 so as to perform the adjustment of the hydraulic characteristics including the orifice 80 by the hydraulic pressure control valve 23 alone. Thus, by providing the orifice 80 on the side of the hydraulic pressure control valve 23, the adjusting operation of the hydraulic pressure valve 23 and the orifice 80 can be easily performed.

It should be noted that although the rotation of the protruding portions 55 is limited by the counter force plungers 57a–57d provided on the opposite sides of the protruding portions 55 as the counter force mechanism, the construction of the counter force mechanism is not limited to this structure. For example, a radial system in which a plunger is pressed in a radial direction, or a thrust system in which a plunger is pressed in an axial direction may be used.

The present invention is not limited to the specifically disclosed embodiments, and variations and modifications may be made without departing from the present invention.

What is claimed is:

1. A power steering apparatus comprising:

a rotary control valve, provided in a valve housing, including an input member and an output member connected to each other by a torsion bar, said rotary control valve controlling an amount of working oil to be supplied to a power assist cylinder in response to relative rotation between said input member and said output member;

a counter force mechanism, provided in said rotary control valve, including a counter force plunger, a hydraulic pressure counter force chamber located on an outer side of said counter force plunger and an inside chamber located on an inner side of said counter force plunger, said counter force mechanism providing a counter force to said input member by a pressure difference between a pressure of the working oil in said hydraulic pressure counter force chamber and a pressure of the working oil in said inside chamber;

a hydraulic pressure control valve attached to said rotary control valve, said hydraulic control valve including a counter force mechanism port through which the working oil is supplied to said counter force mechanism; and a connection passage connecting between said inside chamber and said counter force mechanism port.

2. The power steering apparatus as claimed in claim 1, wherein said connection passage includes a first connection port and a second connection port, said first connection port formed in said valve housing, said second connection port formed in said hydraulic pressure control valve.

3. The power steering apparatus as claimed in claim 2, wherein an orifice is provided to said second connection port.

4. The power steering apparatus as claimed in claim 2, wherein a predetermined flow resistance is provided to said second connection port.

5. The power steering apparatus as claimed in claim 1, wherein a predetermined flow resistance is provided to said connection passage so as to restrict a flow of the working oil from said inside chamber to said counter force mechanism port.

6. The power steering apparatus as claimed in claim 1, wherein said connection passage includes a passage located between said inside chamber and an inner wall of said valve housing so as to leads the pressure of the working oil in said inside chamber to an inner side of said valve housing.

7. The power steering apparatus as claimed in claim 6, wherein said connection passage further includes a first connection port and a second connection port, said first connection port formed in said valve housing and connected to said passage, said second connection port formed in said hydraulic pressure control valve.

* * * * *